(12) United States Patent
Aldous (10) Patent No.: US 6,266,017 B1
(45) Date of Patent: *Jul. 24, 2001

(54) RETRACTABLE ANTENNA SYSTEM

(75) Inventor: Stephen C. Aldous, Salt Lake City, UT (US)

(73) Assignee: 3Com Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/865,553

(22) Filed: May 29, 1997

Related U.S. Application Data (63) Continuation-in-part of application No. 09/357,017, filed on Jul. 19, 1999, and a continuation of application No. 08/586,166, filed on May 31, 1996, now abandoned, said application No. 09/357,017, is a continuation of application No. 08/976,819, filed on Nov. 24, 1997, which is a continuation-in-part of application No. 08/689,715, filed on Aug. 16, 1996, now Pat. No. 5,727,972, which is a continuation of application No. 08/291,277, filed on Aug. 16, 1994, now Pat. No. 5,547,401, which is a continuation-in-part of application No. 08/040,656, filed on Mar. 31, 1993, now Pat. No. 5,338,210, which is a continuation-in-part of application No. 07/974,253, filed on Nov. 10, 1992, now abandoned, which is a division of application No. 07/866,670, filed on Apr. 8, 1992, now Pat. No. 5,183,404.

(51) Int. Cl.$^7$ .............................. H01Q 1/24; H04B 1/08; H04B 1/38
(52) U.S. Cl. ..................... 343/702; 343/846; 343/906; 455/90; 455/575; 455/348
(58) Field of Search .................................. 343/702, 905, 343/906, 846, 830, 848; 455/90, 557, 575, 348, 351; H01Q 1/24

(56) References Cited

U.S. PATENT DOCUMENTS

| | | | | |
|---|---|---|---|---|
| 2,531,215 | * | 11/1950 | Harmon | 343/702 |
| 4,543,581 | * | 9/1985 | Nemit | 343/702 |
| 5,373,149 | * | 12/1994 | Rasmussen | 235/492 |
| 5,557,288 | * | 9/1996 | Kato et al. | 343/702 |
| 5,627,550 | * | 5/1997 | Sanad | 343/702 |
| 5,646,635 | * | 7/1997 | Cockson et al. | 343/700 MS |
| 5,667,390 | | 9/1997 | Keng | 439/76.1 |
| 5,773,332 | | 6/1998 | Glad | 439/344 |
| 5,918,163 | | 6/1999 | Rossi | 455/90 |

* cited by examiner

Primary Examiner—Michael C. Wimer
(74) Attorney, Agent, or Firm—Workman Nydegger & Seeley (57) ABSTRACT

The invention discloses a retractable antenna system for wireless communication devices. The invention allows the entire antenna assembly, including ground plane and impedance matching circuitry, to be moved away from the wireless communication device and extend beyond any housing, such as a portable computer, to improve antenna performance. The disclosed embodiments include movable sections which can move the ground plane and active radiating element of the antenna outside a housing which encloses or partially encloses the communication device, such as when a PC Card cellular modem is placed within the housing of a laptop or notebook computer. Other embodiments include sections which are detachable from the wireless communication device.

4 Claims, 4 Drawing Sheets

RETRACTABLE ANTENNA SYSTEM

CROSS-REFERENCE TO RELATED APPLICATIONS

This application is a continuation of U.S. patent application Ser. No. 08/586,166, filed May 31, 1996, of Stephen C. Aldous for RETRACTABLE ANTENNA SYSTEM, now abandoned.

This application is a continuation-in-part of U.S. application Ser. No. 09/357,017 filed on Jul. 19, 1999, which is a continuation of U.S. application Ser. No. 08/976,819 that was filed on Nov. 24, 1997; which is a continuation-in-part of U.S. application Ser. No. 08/689,715 that was filed on Aug. 16, 1996 and is now U.S. Pat. No. 5,727,972; which is a continuation of U.S. application Ser. No. 08/291,277 that was filed on Aug. 16, 1994 and is now U.S. Pat. No. 5,547,401; which is a continuation-in-part of U.S. application Ser. No. 08/040,656 that was filed on Mar. 31, 1993 and is now U.S. Pat. No. 5,338,210; which is a continuation-in-part of U.S. application Ser. No. 07/974,253 that was filed on Nov. 10, 1992 and is now abandoned; which is a divisional of U.S. application Ser. No. 07/866,670 that was filed on Apr. 8, 1992 and is now U.S. Pat. No. 5,183,404. These related applications listed above are expressly incorporated by reference in their entireties.

BACKGROUND OF THE INVENTION

1. The Field of the Invention

This invention relates generally to antenna systems, and more particularly, to retractable antenna systems for use in PC Card devices.

2. Present State of the Art

One of the defining characteristics of modem society is the ability to communicate virtually instantaneously over vast distances. Developments in communication technology have freed individuals from the necessity of conducting face to face business transactions. Indeed, with little more than a telephone, and perhaps a computer, an individual can conduct business transactions worldwide through various telephones and/or computer networks.

While the vast web of computer and telephone networks encircling the globe allows almost instantaneous communication between individuals, the communication is generally conducted from place to place and not from person to person. In other words, wired or landline communication networks, such as the telephone network or the Internet, of necessity connect one location to other locations. Thus, when one individual desires to communicate with another individual he or she must locate that individual by telephoning or contacting various locations.

In addition to voice communications over telephone networks, today's communication environment also involves the transfer of vast amounts of digital data over the telephone network or other landline computer networks. Advances in computer technology have placed extremely powerful computers on the desktops of many people throughout the world. Using a telephone or other communication network, these computers can be linked together in order to allow information to be transferred, shared, and exchanged between various individuals. The advent of such technology has opened up broad new possibilities. Taking advantage of such technology, companies have been able to establish remote offices at various locations and conduct business through the sharing and transfer of information over various communication networks.

As computers have continued to become smaller, lighter, and more portable while simultaneously becoming more powerful, the ability of a business executive to take his or her entire "office" on a business trip has become a real possibility. By carrying a small, lightweight, portable computer, and using ordinary telephone lines, an individual may be able to work and share information with the office from virtually any location where access to the telephone network is available. Traditionally, such access has been through landline telephone networks.

From the above description, it is clear that while landline communication networks have created vast opportunities and possibilities for individuals, further advancements and improvements are possible. In many instances the conveniences afforded by a landline communication network are offset somewhat by the inconvenience of being tied to a specific location. Individuals who travel often may find themselves at a location without access to a landline communication network.

In order to overcome these and other problems, wireless communication methods have been developed. Currently, the communications industry is experiencing an explosion of technologies which have been used to build infrastructures to support wireless communications. Major cities throughout the world provide access to cellular communication networks which allow individuals to communicate using wireless cellular telephones. In addition, a dizzying array of beepers and pagers are also available. The trend in all of these markets is towards smaller, more personal communication devices. Since these devices continue to become smaller, and all wireless communication devices must have an antenna system, integration of effective and efficient antenna systems can become problematic. In general, however, antennas which retract inside the housing of the communication device are preferred because such antennas are less prone to breakage and are more compact and elegant in retraction than antennas which remain constantly exposed.

Although many popular devices are directed to voice communications between individuals in the form of cellular telephones or other devices, advances are also being made in wireless data communications. For example, cellular or radio modems which allow a computer to be connected to other computers via a cellular telephone network or other wireless networks can be purchased from many different manufacturers. Obviously, the utility of such a cellular modem is greater with a portable computer than with a non-portable computer.

The most portable computers available today are the small laptop, notebook, and palmtop type computers. Integrating a cellular modem into a small portable computer, however, creates many difficulties. These computers typically have a small form factor and are designed to close up into a relatively small space with clean exterior lines to aid in carrying and transporting the computer. Because wireless communications requires an antenna, one of the major problems encountered when cellular modems are integrated into small portable computers is the integration of the antenna into the computer. Previous attempts to integrate antennas with portable computers have met with only moderate success.

For example, one approach to integrating an antenna with a portable computer is to integrate the antenna into the housing of the computer in much the same way that a cellular telephone antenna is integrated into the housing of the cellular telephone. In other words, a hole can be formed in the housing of the computer and the antenna can be made to retract into, and extend from, the hole. For portable computers using a flip up screen, it may be possible to form this hole along side the screen so that the antenna is in a substantially vertical orientation when the antenna is extended while the computer is being used.

Other attempts to integrate antennas with small portable computers have focused on internal antennas. In these attempts, the antennas are placed inside the computer case so as to be hidden from view. These antennas are typically loop or strip antennas which cannot be extended.

A significant problem with both antennas integrated with the computer case so that they can be extended or retracted into the computer case and with antennas mounted inside the computer case is that computers must be designed around them. Such antenna designs are typically matched to a single type of proprietary computer. Many computer makers are unwilling to commit antenna and wireless modems to hardware platforms given the low percentage of users who will want them. Users would like, ideally, to connect a wireless modem/antenna to a wide variety of computers, including those not specifically designed for wireless communications.

In order to overcome the limitations of the proprietary peripheral ports, the industry has developed standard peripheral slots such as the PC Card standard. This standard, also referred to as the PCMCIA standard, defines a small form factor peripheral about the size of a thick credit card and a corresponding peripheral slot in the portable computer. Peripherals conforming to the PC Card standard can be plugged into any computer having a PC Card slot. The available peripherals include hard disk drives, memory expansion upgrades, landline modems, local area network (LAN) cards, and the like. Most recently, several manufactures have attempted to provide radio modems which loosely conform to the PC Card standard and can be plugged into a PC Card slot. Unfortunately, producing a radio modem for use with a PC Card slot has produced less than satisfactory results.

When installed, standard size PC Cards are generally at least flush with the computers they reside in, and are usually recessed to some degree. When installed, some cards are recessed from the outside of the computer housing by as much as 0.3 inches. Any antenna attached to the PC Card will thus be recessed inside the computer case to some degree. Antennas used to transmit or receive electromagnetic signals perform best if the entire active portion of the antenna is outside of the computer housing during operation. In order to achieve this capability, several manufactures have taken different approaches.

Figure 1:
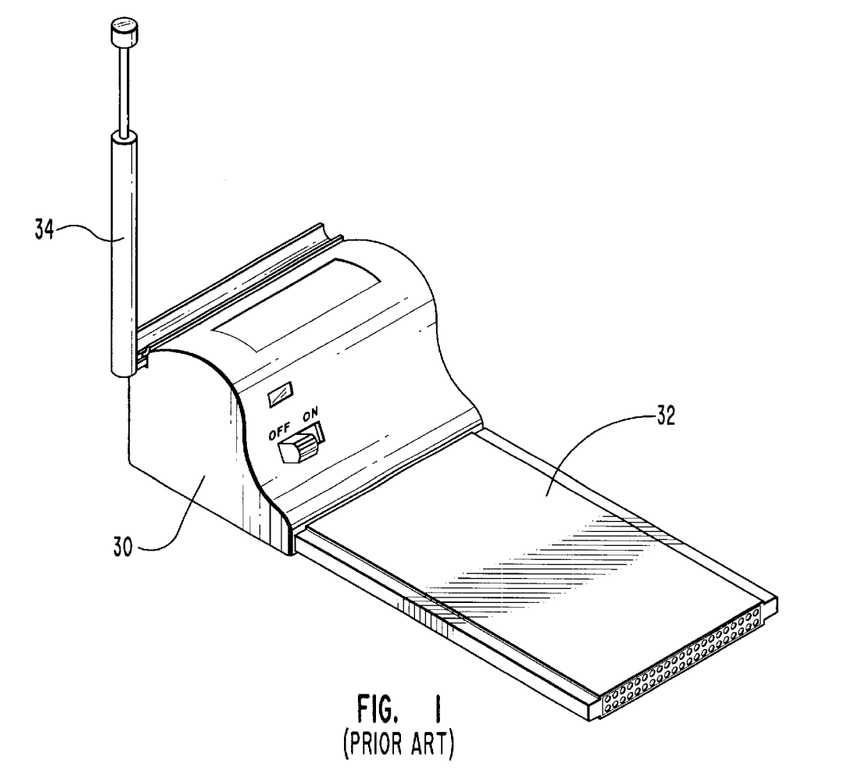
FIG. 1 is a perspective view of a prior art extended card cellular modem.

One approach illustrated in FIG. 1 has been to create "extended" PC Card radio modems so that a portion of the PC Card remains outside the housing of the computer. In FIG. 1, the portion of the card residing inside the housing of the computer is labeled 32 and the portion of the card remaining outside the housing of the computer is labeled 30. The antenna 34 is then attached to the portion of the card which remains outside the housing of the computer. In this manner, the antenna not only remains outside the computer, but can also be oriented in the vertical position. In a cellular environment it is believed that an antenna oriented in the vertical position provides better performance than an antenna which is oriented in a horizontal position.

Unfortunately, extended PC Card cards can create several problems. For instance, leaving a portion of the PC Card outside the computer housing destroys the clean lines of the computer. While in transport, the extended card is subject to breakage due to the bumps and rough handling that sometimes accompany transport of a portable computer. In addition, many computers will not fit within their carrying cases with an extended PC Card attached. Thus, in order to transport the computer, the extended PC Card must usually be removed from the computer. This can further subject the extended PC Card to damage through exposure to static electricity or other abuses. Such an arrangement also subjects the extended PC Card to loss, and is inconvenient for the user.

Figure 2:
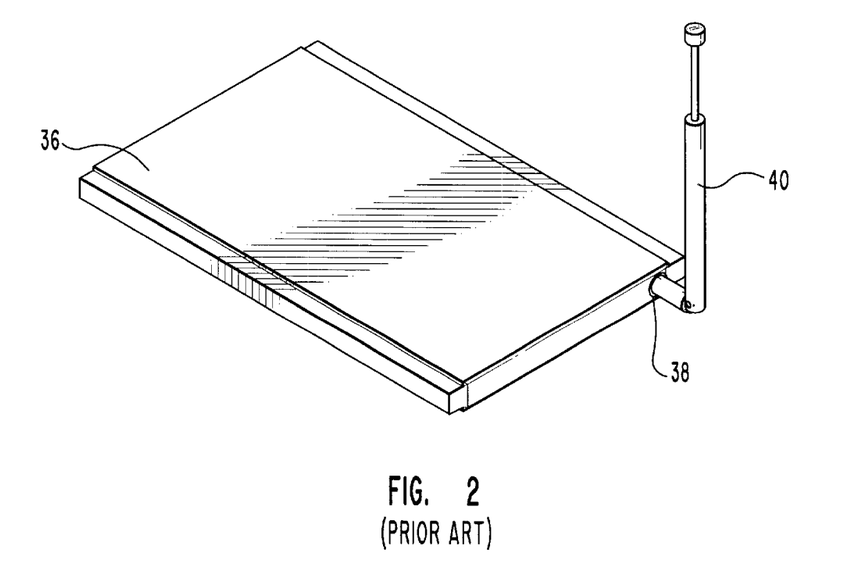
FIG. 2 is a perspective view of a prior art device having a detachable antenna portion.

In order to alleviate some of the problems associated with extended PC Card cards, one could have a detachable antenna. An example of such a design is illustrated in FIG. 2. In these designs, the major body of the PC Card 36 remains inside the computer and can be protected by the doors which often cover the PC Card. Along the outside end of the PC Card is a proprietary connector 38 which allows a detachable antenna 40 to be connected to the PC Card. When a user wants to use the cellular modem, the PC Card access door is opened and antenna 40 is attached to PC Card 36 via proprietary connector 38.

Although such a design protects the PC Card and keeps the PC Card inside the machine, the design also creates additional problems. This design suffers from various drawbacks including: 1) the detached antenna can be bulky; 2) the antenna is easily damaged; 3) the antenna is subject to loss; and 4) such an arrangement is inconvenient for the user.

Furthermore, such a design has suboptimal performance. This is because the antenna has a bend in the active portion and attaches to a standard length Type 2 card as shown in FIG. 2. Such an arrangement can leave a portion of the active antenna element inside the computer case. This antenna design would have suboptimal gain.

It would, therefore, represent an advancement in the art to provide a cellular modem in a small form factor, such as the PC Card form factor, which retains the advantages of a clean computer outline for travel and storage, has an antenna whose entire active portion resides outside the computer housing during operation, which has no bends in the active portion, and which does not subject a portion of the cellular modem to loss or damage during storage or transportation of the computer.

SUMMARY AND OBJECTS OF THE INVENTION

The current invention has been developed in response to the present state of the art and, in particular, to the problem of integrating a retractable antenna into a small wireless communications device. This problem of integrating a retractable antenna into a wireless communication device is exacerbated when the device is disposed within a larger housing such as a computer housing.

It is, therefore, an object of the present invention to provide a retractable antenna system which can be stored in a small wireless communication device.

Another object of the present invention is to provide an antenna system which can be retracted into a larger housing such as a portable computer housing.

Yet another object of the present invention is to provide a retractable antenna system which can be retracted into a PC Card.

A further object of the present invention is to provide a retractable antenna system which can store an antenna in a very small area.

Another object of the present invention is to provide an antenna system that can be retracted into a small communications device and yet has an active radiating element that can reside completely outside of a larger housing when the communications device is in operation, and which can operate in a straight, vertical position for optimal operation.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims.

To achieve the foregoing objects, and in accordance with the invention as embodied and broadly described herein a retractable antenna assembly is provided. Those skilled in the art will recognize that the principles presented in this invention can be applied to any small form factor wireless communication device. Examples of such devices may be pagers, portable Global Positioning System (GPS) receivers, cellular telephones, cellular modems integrated into small form factor packages such as a PC Card, cellular modems integrated into small notebook, laptop, palmtop, or PDA computers, or any other wireless personal communication device. Thus, although the principles of the present invention may be described with reference to a limited set of currently preferred embodiments, these embodiments are given by way of example and not limitation.

In one preferred embodiment, it is desirable to ensure that in operation the entire active element of the antenna is straight, vertical, and operates beyond the housing of the computer. In order to achieve such a function, the RF ground and any impedance matching circuitry should extend beyond the computer housing. In order to accomplish this, the PC Card has a slidable portion which forms an RF ground when it is extended beyond the computer housing. In some cases, the slidable portion may also contain an impedance matching circuit and other circuitry. In the case of some antennas, when the slidable portion is extended, it forms an RF ground which may include not only the slidable portion but also the case of the PC Card and possibly the entire chassis of the computer. This creates a sufficiently large counterpoise for the quarter wave monopole antenna to work against.

In environments where a PC Card is horizontally oriented, a swiveling antenna is contemplated. Thus, where the antenna is mechanically attached to a slidable portion of the PC Card which can be extended beyond the computer housing, the antenna may be hingedly attached to the slidable portion. Such a feature allows the antenna to be swiveled relative to the PC Card case and oriented in a variety of directions. The ability to alter the orientation of the antenna is believed to allow a user to increase the performance of the device to the maximum possible extent. A vertically oriented antenna projects most of the electromagnetic energy horizontally away from the antenna. It is believed that this electromagnetic wave is typically better received by a cellular receiving antenna.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The concepts of the present invention are useful when a communication device resides in a larger housing such as when a radio modem card resides in the housing of a portable computer. Those skilled in the art will recognize that the principles presented in this invention can be applied to a wide variety of wireless communication devices. Examples of such devices may be pagers, cellular telephones, radio modems integrated into small form factor packages such as a PC Card, radio modems integrated into small notebook, laptop, palmtop, or PDA computers, portable GPS receivers, or any other wireless personal communication devices with a form factor which resides in another housing. Thus, although the principles of the present invention are described with reference to a limited set of currently preferred embodiments, these embodiments are given by way of example and not limitation.

If a wireless communication device is contained within a larger housing, such as when a PC Card is contained within the housing of a computer, problems may arise in providing an effective antenna system. In order to have an effective antenna system, it is preferred that the entire active radiating element of the antenna system operate completely outside any housing enclosing, or partially enclosing, the wireless communication device. This may be accomplished by extending the active radiating element beyond any housing associated with, or at least partially enclosing, the wireless communication device. If a portion of the active radiating element remains inside the housing, performance of the wireless communication device will suffer. It is, therefore, preferred that the entire active radiating element extend beyond any housing. It is also preferable to have no bends in the active radiating element of the antenna. At the same time, it is preferable to be able to retract the antenna assembly inside the housing when not in use.

Figure 3:
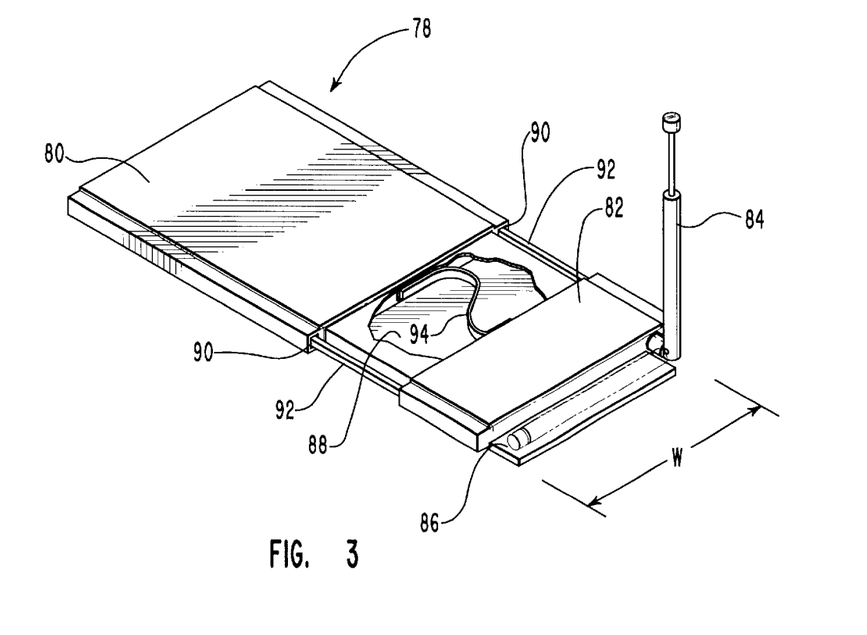
FIG. 3 is a perspective view of one preferred embodiment of the present invention incorporated into a cellular modem.

Turning now to FIG. 3, an embodiment designed to allow the entire active radiating element of an antenna to extend beyond a housing which is enclosing or partially enclosing the wireless communication device is presented. The wireless communication device, shown generally as 78, comprises housing 80. In one preferred embodiment, housing 80 forms a portion of a PC Card standard form factor.

In order to provide the entire active radiating element outside of any housing enclosing the communication device, it is preferred that the RF ground also be extended beyond any housing enclosing the wireless communication device. This is true either when a monopole antenna is used or when a dipole antenna is used, although the specific details and function of the RF ground is somewhat different in each case. Thus, in one preferred embodiment, grounding means movable between a retracted position and an extended position, for forming an RF ground which extends beyond the housing enclosing the wireless communication device are provided. In FIG. 3, such grounding means comprise movable portion 82. It is preferred that movable portion 82 be operable between a retracted position and an extended position. In FIG. 3, movable portion 82 is illustrated in an extended position. In such a position, movable portion 82 is separated from housing 80 by sufficient distance to move at least a portion of movable portion 82 beyond any housing which at least partially enclose communication device 78. In one preferred embodiment, when movable portion 82 is in a retracted position, movable portion 82 and housing 80 combine to form a standard size PC Card such as a Type 2 PCMCIA Card having well known dimensions of about 85.6 mm in length by about 54 mm in width in a substantially rectangular shape by about 5.5 mm in thickness. Type 1 and Type 3 cards have similarly sized substantially rectangular shapes with about 3.3 mm and about 10.5 mm thickness, respectively.

Attached to movable portion 82 is antenna 84. In FIG. 3, antenna 84 is shown as being hingedly attached to one corner of movable portion 82 such that antenna 84 is flexible. In this embodiment, movable portion 82 has also formed therein antenna rest 86. Antenna rest 86 is sized to prevent antenna 84 from over rotation when stowed so that a flush surface is formed with movable portion 82. This will allow movable portion 82 to be retracted and extended without interfering with other structures surrounding communication device 78.

In FIG. 3, antenna 84 is illustrated as a multiple segment antenna. If communication device 78 is a PC Card, the width W of housing 80 and movable portion 82 is about two inches. This allows an antenna length of up to about four inches with a two-segment antenna and up to about six inches with a three segment antenna. Thus, sufficient space is provided to incorporate a two-segment monopole antenna or a three-segment dipole antenna for typical cellular telephone frequencies.

For maximum performance, any grounding means should form an RF ground which extends beyond a housing enclosing or partially enclosing the communication device. When a monopole antenna is utilized, it is preferred that such grounding means provide an extended RF ground which incorporates the housing of the communication device itself. In FIG. 3, if antenna 84 were a monopole antenna then it would be preferred that movable portion 82 form an extended RF ground plane with housing 80. In order to achieve this extended RF ground, it may be necessary to include a grounding sheet attached to movable portion 82 and housing 80 which couples the exterior of movable portion 82 with housing 80. In FIG. 3, such a ground sheet is illustrated by ground plane 88 which covers both the top and bottom areas as illustrated. Although such a ground plane structure is preferred, the illustrated structures should not be construed as limiting the scope of the invention. Any method which can achieve an adequate RF ground on movable portion 82 can be used. The purpose of ground plane 88 is to couple housing 80 with the exterior movable portion 82 in order to form an extended counterpoise for the monopole antenna to work against.

If movable portion 82 is to form an extended RF ground with housing 80 when in the extended position, ground plane 88 must be electrically connected to housing 80 at least when movable portion 82 is in the extended position. This can be accomplished in a wide variety of ways. For example, spring contacts can be located on either ground plane 88 or housing 80 to achieve good electrical contact between them. Alternatively, ground plane 88 can be connected to housing 80 through a flexible cable or the like. It is preferred that any connection present as low an impedance as possible. All that is required is sufficient, low impedance connection between ground plane 88 and housing 80.

The structure illustrated in FIG. 3 may also extend the RF ground beyond housing 80 to include the entire computer chassis (not shown) as well. In order to form a solid ground with PC Cards, most computers have connectors, such as spring contacts, which connect the PC Card case to the computer chassis. If the structure illustrated in FIG. 3 is used with such a computer, the RF ground will extend to include the computer chassis further enhancing the performance of the system.

Although the embodiment illustrated in FIG. 3 utilizes a monopole antenna, it is also possible to incorporate a dipole antenna system in the embodiment illustrated in FIG. 3. If a dipole antenna system is utilized in the embodiment illustrated in FIG. 3, a large counterpoise need not be constructed. As those skilled in the art understand, an end fed or voltage fed dipole antenna can be formed without the need for a counterpoise. An end fed dipole antenna, however, generally still needs to be impedance matched to the RF devices connected to it. In the embodiment illustrated in FIG. 3, such an impedance matching circuit may be formed on movable portion 82. This typically will require that movable portion 82 have formed therein an RF ground. Depending on the type of RF ground needed, it may or may not be necessary to include ground plane 88 which connects housing 80 with movable portion 82.

When an antenna is utilized with an embodiment having a movable portion, it may be preferred to include the entire RF section of the communication device on the movable portion. This eliminates the need to form an RF connection which can efficiently channel RF energy from inside housing 80 across the space that separates housing 80 with movable portion 82, through movable portion 82, and finally to the antenna. If the RF section is located inside housing 80, any such RF connection would have to be formed so that it could extend and retract with movable portion 82. Again, although such a structure may be preferred, it is not limiting of the scope of this invention.

Because movable portion 82 must move between a retracted position and an extended position, an embodiment must contain slide means for allowing movable portion 82 to slide between a retracted position and an extended position. By way of example and not limitation, in FIG. 3 such slide means are illustrated by slides 92. Slides 92 are formed integrally with movable portion 82 and received into slide channels 90. A wide variety of structures may be utilized to accomplish the same objective. Such slide means may also comprise a sleeve-like structure which totally encloses the interior space between movable portion 82 and housing 80. Such a structure would enclose any connecting wires connecting the electronic circuitry residing in housing 80 with any electronic circuitry residing in movable portion 82. Other structures which only partially enclose the space between movable portion 82 and housing 80 may also be used.

When an embodiment includes circuitry on a movable portion movable between a retracted position and an extended position, means to electrically couple the circuitry within housing 80 with the circuitry on the movable portion is required. By way of example, and not limitation, in FIG. 3 such means comprises ribbon cable 94. Ribbon cable 94 should have a sufficient number of conducting wires to carry needed electrical signals between the electronic circuitry residing in housing 80 and any electronic circuitry residing in movable portion 82. A wide variety of other structures are also useful in forming means to electrically couple the electronic circuitry residing in housing 80 with grounding means movable between a retracted position and an extended position. By way of example, and not limitation, other structures useful in implementing such means can include individual wire bundles, optical fibers, transmission lines formed on printed circuit boards, and the like.

Figure 4:
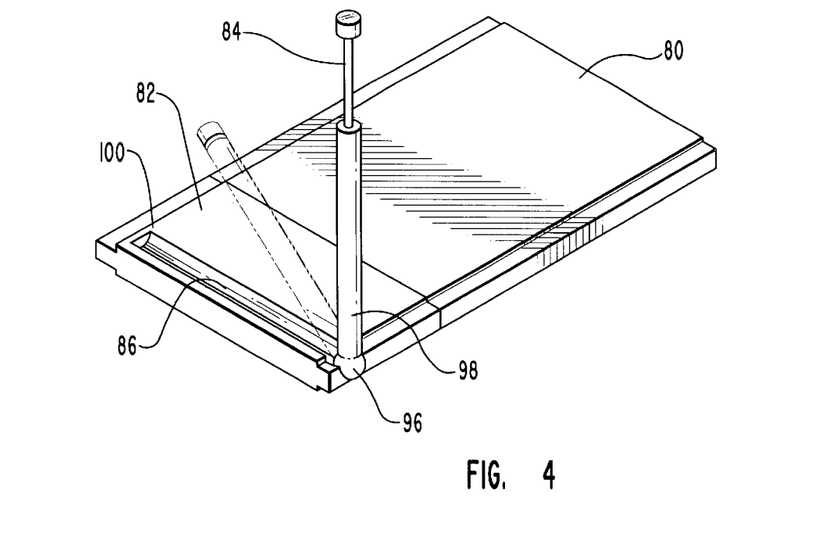
FIG. 4 is a partial perspective view illustrating another method of attaching the antenna.

Turning next to FIG. 4, an alternate method of hingedly attaching an antenna to movable portion 82 is illustrated. With reference to FIG. 4, antenna 84 resides in antenna channel 86. At one end of movable portion 82 is swivel ball 96. When the antenna is to be extended, antenna 84 is tilted into a substantially vertical position as illustrated in FIG. 4. The segmented antenna may then be extended. Because swivel ball 96 is used, such an embodiment would allow antenna 84 to rotate in many directions.

Figure 5:
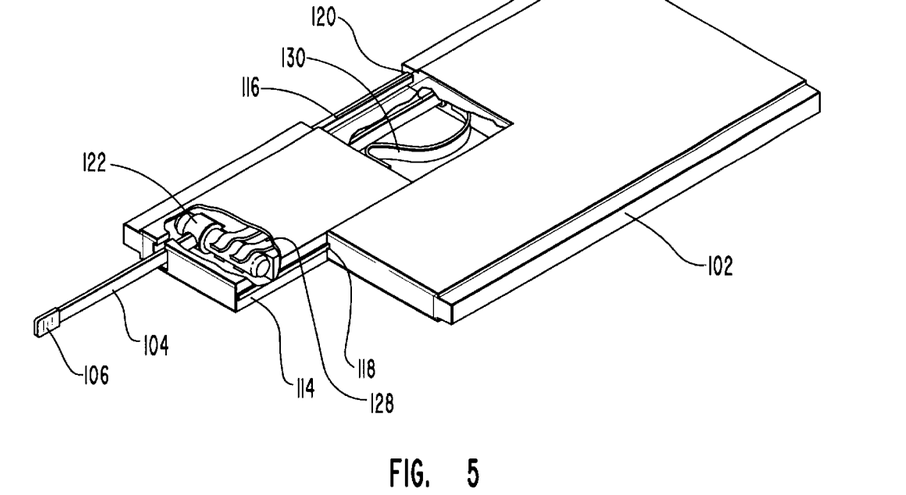
FIG. 5 illustrates another preferred embodiment having a slidable section and a swivel antenna.

FIG. 5 illustrates another preferred embodiment of the present invention. Embodiments within the scope of this invention can be provided with grounding means, movable between a retracted position and an extended position, for forming an RF ground plane which extends beyond any housing which may enclose or partially enclose the wireless communication device. In FIG. 5, such grounding means are illustrated by movable portion 114. In the preferred embodiment illustrated in FIG. 5, movable portion 114 does not extend the full width of housing 102. Such an embodiment may be desired where the electronic circuitry incorporated into movable portion 114 does not require an area which extends the full width of housing 102.

Movable portion 114 is designed to move between a retracted position and an extended position. Movable portion 114 is therefore connected to housing 102 via sliding means for allowing movable portion 114 to slide between an extended position where movable portion 114 is separated from housing 102 by a predefined distance and a retracted position where movable portion 114 is next to housing 102. In the preferred embodiment illustrated in FIG. 5, such sliding means comprise slide 116 and tongue and groove assembly 118. In FIG. 5, slide 116 is received into slide channel 120. Tongue assembly 118 is formed from a dovetail or tongue and groove shape formed between movable portion 114 and housing 102.

Figure 6:
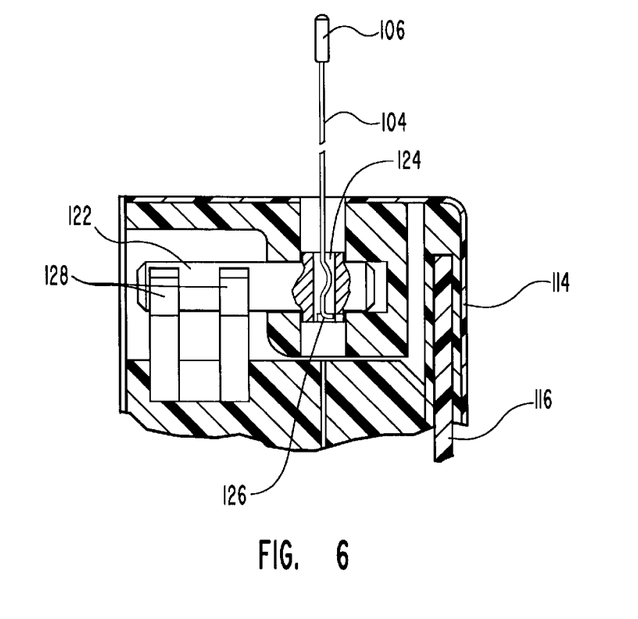
FIG. 6 is a cross section of the embodiment illustrated in FIG. 5 showing the details of the swivel mechanism.

When antenna 104 is connected to movable portion 114, swivel means for hingedly attaching antenna 104 to movable portion 114 may also be provided. In FIGS. 5 and 6, such swivel means comprise cylindrical swivel 122. As perhaps best illustrated in FIG. 6, cylindrical swivel 122 has formed therethrough a slide hole 124. Slide hole 124 has the same cross section as antenna 104 and is sized to allow antenna 104 to slide in close tolerance.

On the end of antenna 104, opposite finger grip 106, can be formed antenna stop 126. Antenna stop 126 is preferably formed so that it will not pass through slide hole 124. Antenna stop 126 aids in the proper deployment of antenna 104. Deployment of antenna 104 proceeds as follows. When a user desires to communicate using the wireless communication device, he or she grasps finger grip 106 and pulls antenna 104 from inside housing 102. When antenna stop 126 reaches cylindrical swivel 122 and is stopped, the user continues to pull. This will cause movable portion 114 to move from its retracted position to its extended position. At this point, the user rotates the antenna from a horizontal position to a vertical position. Retraction of antenna 104 is accomplished by reversal of the technique described above.

Because antenna 104 must be rotated from a horizontal position into a vertical position, cylindrical swivel 122 must be provided with means to electrically connect antenna 104 to the electrical circuitry residing in movable portion 114. In FIG. 6, such means are illustrated by electrical contacts 128. As illustrated in FIG. 6, electrical contacts 128 are formed so as to encircle cylindrical swivel 122. Conducting material can then be placed on cylindrical swivel 122 so as to carry the electrical signals from electrical contacts 128 to antenna 104. As illustrated in FIG. 6, electrical contacts 128 are designed to conduct electrical signals regardless of the orientation of antenna 104. This allows a user to swivel antenna 104 in a more horizontal or more vertical direction until the maximum possible electromagnetic signal strength is achieved.

As with previous embodiments depicting grounding means which move between a retracted position and an extended position, the embodiment illustrated in FIG. 5 can be used with a monopole antenna, a dipole antenna, or other types of antennas. In the case of a monopole antenna, it is desired to have movable portion 114 form an extended ground plane with housing 102 so that a large counterpoise is formed. As discussed before, any extended RF ground may extend to include the computer chassis (not shown) as well. If the antenna used requires impedance matching, it is preferred that movable portion 114 contain an RF ground and an impedance matching circuit which matches the characteristic impedance of antenna 104 to the RF circuitry 200 residing in movable portion 114. Furthermore, movable portion 114 may contain some or all of the necessary RF circuitry to transmit and/or receive an electromagnetic signal through antenna 104.

In order to electrically couple signals from movable portion 114 to the electronic circuitry residing in housing 102, it is necessary to provide means to couple electronic signals between movable portion 114 and housing 102. In FIG. 5, such means are depicted by ribbon cable 130. Ribbon cable 130 should have sufficient conducting wires to carry the signals necessary between the electronic circuitry housed in housing 102 and the electronic circuitry residing on movable portion 114. Structures other than a ribbon cable may also be used to accomplish the desired objective. By way of example, and not limitation, the means to couple electrical signals between the electronic circuitry residing in housing 102 and the electronic circuitry on movable portion 114 comprise individual conducting wires, fiber optic lines, transmission lines formed on a printed circuit board, and the like.

Figure 7:
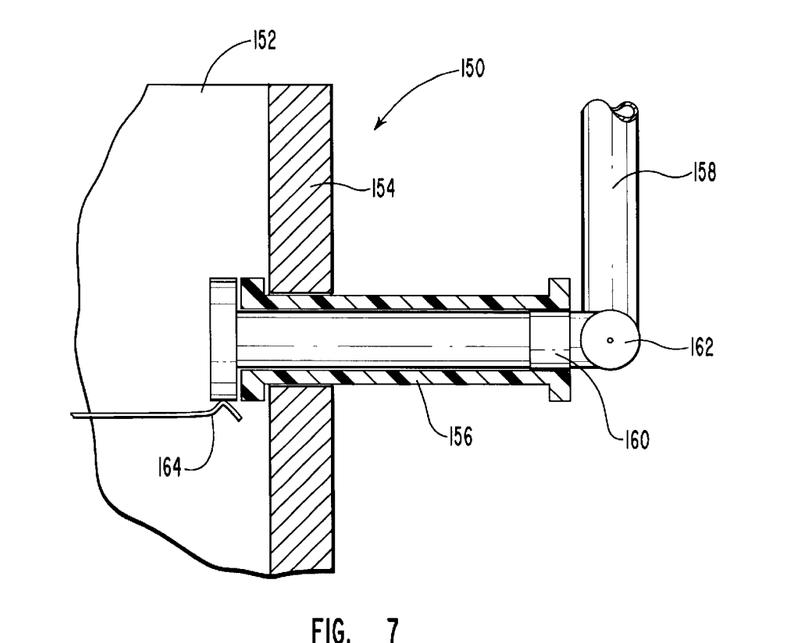
FIG. 7 is a partial cross section of another embodiment.

FIG. 7 contains a partial cross section of another preferred embodiment. In this embodiment, rather than have a larger movable portion which may or may not contain RF circuitry, the embodiment in FIG. 7 is designed to have a relatively small movable portion. However, the embodiment still accomplishes the goal of extending the active radiating element of the antenna beyond any housing which encloses or partially encloses the wireless communication device. The embodiment also provides a ground plane which extends beyond any housing which may enclose or partially enclose the wireless communication device.

Turning now to FIG. 7, the wireless communication device, shown generally as 150, comprises housing 152. In one preferred embodiment, housing 152 forms a portion of a PC Card device. Wireless communication device 150 also comprises RF ground 154. As explained in conjunction with other embodiments disclosed in this invention, RF ground 154 may also form part of a larger grounding surface that may include the outside case of housing 152 and, perhaps, even the chassis of a computer containing wireless communication device 150. The latter may particularly be found when wireless communication device 150 is a standard PC Card device.

In order to provide the entire active radiating element outside of any housing enclosing or partially enclosing the communication device, it is preferred that the RF ground also be extended beyond any housing enclosing the wireless communication device. Thus, the embodiment in FIG. 7 comprises grounding means movable between a retracted position and an extended position for forming and RF ground which extends beyond housing 152. In FIG. 7, such grounding means comprises slidable collar 156. As illustrated in FIG. 7, slidable collar 156 is formed to provide good contact with RF ground 154. Any means forming a good low impedance connection between slidable collar 156 and RF ground 154 may be used.

As illustrated in FIG. 7, disposed within slidable collar 156 is antenna 158. Antenna 158 is preferably formed so as to be slidable within slidable collar 156. In this way, antenna 158 may be retracted along with slidable collar 156 into a position flush, or nearly flush with housing 152. Similarly, antenna 158 and slidable collar 156 may be extended away from housing 152 in order to deploy slidable collar 156 and antenna 158 outside any housing which encloses or partially encloses communication device 150. Such an arrangement allows the entire active radiating portion of antenna 158, along with an associated RF ground, to operate beyond the confines of any housing structures. In this embodiment, it is understood that an insulating means be provided between antenna 158 and slidable collar 156 to prevent direct electrical contact between them. This could either be a separate piece or a coating on one of the mating surfaces.

Illustrated in FIG. 7 is an optional impedance-matching section 160 which may reside within slidable collar 156 when antenna 158 is in the deployed or operational position. Antenna 158 may also contain hinge 162. Since antenna 158 is slidable within slidable collar 156, the inclusion of hinge 162 allows antenna 158 to be positioned in any orientation outside of any housing which may enclose or partially enclose wireless communication device 150. Hinge 162 allows antenna 158 to rotate in one direction while the slidable nature of antenna 158 within slidable collar 156 allows antenna 158 to be rotated in another direction. Together, these two rotations provide two degrees of freedom to antenna 158 and allow antenna 158 to be positioned in any desired orientation outside of any housing which encloses or partially encloses wireless communication device 150. In accordance with the present invention, this will allow antenna 158 to be oriented in a vertical direction which will enhance performance of the antenna system as previously described.

FIG. 7 also illustrates antenna contact 164 which allows antenna 158 to be connected to the necessary communication circuitry (not shown) disposed within housing 152. In FIG. 7, antenna contact 164 is illustrated as a spring contact which engages antenna 158 when antenna 158 is in the extended or deployed position. Any method which provides a good, low-impedance connection between antenna 158 and the appropriate communication circuitry (not shown) disposed within housing 152 can be used. Such connection methods are known to those skilled in the art and include flexible cable and the like.

Figure 8:
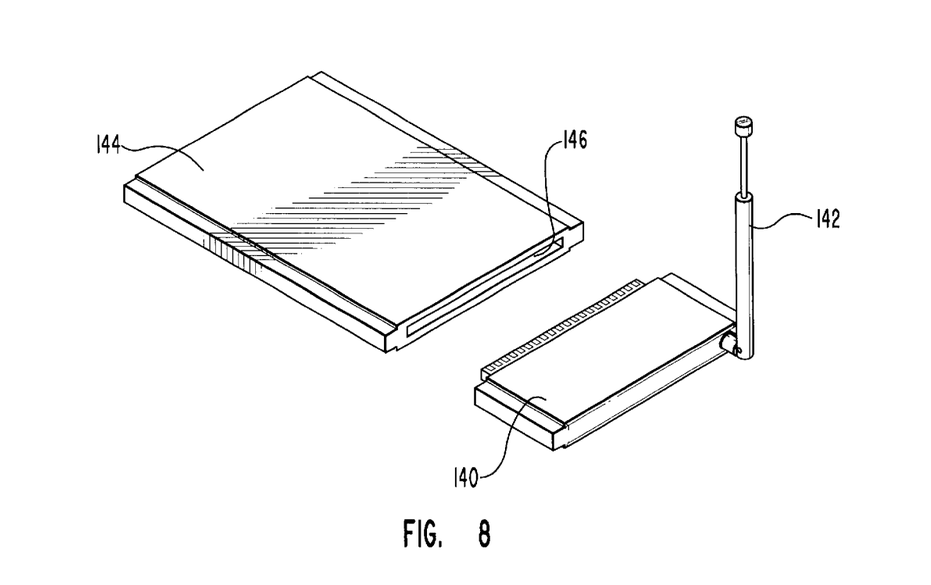
FIG. 8 illustrates an alternate embodiment with a detachable circuitry section.

Turning to FIG. 8, another preferred embodiment is illustrated. FIG. 8 illustrates an embodiment with detachable portion 140. Attached to detachable portion 140 is dipole antenna 142. Dipole antenna 142 is preferably hingedly attached to detachable portion 140 and designed to fold compactly with detachable portion 140. As illustrated in FIG. 8, detachable portion 140 can be attached to housing 144 through connector 146.

In the embodiment in FIG. 8, grounding means for forming an RF ground which extends beyond any housing which may enclose or partially enclose the device may be provided. In FIG. 8, such grounding means comprises detachable portion 140. Detachable portion 140 may also contain some or all of the RF circuitry needed to radiate and/or receive an RF signal via antenna 142. Such an approach has the advantage of isolating all or part of the RF circuitry in a single, replaceable part.

This structure allows various RF sections to be provided in various different detachable portions. This allows a single device to be used with a wide variety of wireless communication networks. For example, one detachable portion may allow the device to communicate with the U.S. cellular network. Another detachable portion may allow the device to communicate with a European cellular network. Yet another detachable portion may also allow the device to communicate over infrared wireless link to a LAN network or other device.

Finally, aspects of the embodiment in FIG. 8 can be combined with aspects of the embodiments in FIGS. 3 or 5 to yield an embodiment where the slidable portion is both detachable and replaceable. Such an embodiment would require the electrical and mechanical connections between the slidable portion and the non-slidable portion to be disconnectable. Such an embodiment could provide the benefit of isolating some or all of the RF circuitry in a removable portion while also providing the benefit of a retractable portion that can be completely stored inside the housing containing the wireless communication device.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A wireless communication device for use in a host system, the device comprising:

a housing containing electrical circuitry, the housing further including a connector that permits detachable connection to a connector slot formed in the host system, the housing and the connector conforming to the PCMCIA (Personal Computer Memory Card International Association) standards;

an antenna module slidably connected to the housing along a longitudinal axis so as to be capable of being placed in a retracted position and an extended position relative to the housing, the antenna module having a width and a thickness that are each substantially equal to the width and the thickness of the housing, wherein the housing and the antenna module together form a substantially contiguous outer periphery when the module is placed in the retracted position; and an antenna attached to the antenna module and operatively coupled to the electrical circuitry within the housing.

2. A wireless communication device as defined in claim 1, further comprising an RF ground structure that provides an RF ground to the antenna module when in it is placed in the extended position.

3. A wireless communication device as defined in claim 1, wherein the substantially contiguous outer periphery formed between the housing and the antenna module when the module is placed in the retracted position has physical dimensions that conform substantially to that which is defined by the PCMCIA (Personal Computer Memory Card International Association) standard.

4. A wireless communication device for use in a host system having a PCMCIA (Personal Computer Memory Card International Association) standard slot, the device comprising:

a housing containing electrical circuitry, the housing further including a PCMCIA-compliant connector that permits detachable connection to the slot formed in the host system;

an antenna module slidably connected to the housing along a longitudinal axis so as to be capable of being placed in a retracted position and an extended position relative to the housing, the antenna module having a width and a thickness that are each substantially equal to the width and the thickness of the housing, wherein the housing and the antenna module together form a substantially contiguous outer periphery having physical dimensions that conform substantially to that which is defined by the PCMCIA standard when the module is placed in the retracted position; and an antenna attached to the antenna module and operatively coupled to the electrical circuitry within the housing.

* * * * *